(12) United States Patent
Broadbent (10) Patent No.: US 10,654,540 B2
(45) Date of Patent: May 19, 2020

(54) CYCLE CARRIER STRUCTURE

(71) Applicant: TAILFIN LIMITED, Bristol (GB)

(72) Inventor: Nicholas Martin Broadbent, Bristol (GB)

(73) Assignee: TAILFIN LIMITED (GB)

( * ) Notice: Subject to any disclaimer, the term of this patent is extended or adjusted under 35 U.S.C. 154(b) by 0 days.

(21) Appl. No.: 16/075,749

(22) PCT Filed: Feb. 6, 2017

(86) PCT No.: PCT/GB2017/050289
§ 371 (c)(1),
(2) Date: Aug. 6, 2018

(87) PCT Pub. No.: WO2017/134465
PCT Pub. Date: Aug. 10, 2017

(65) Prior Publication Data
US 2019/0039671 A1   Feb. 7, 2019

(30) Foreign Application Priority Data

Feb. 5, 2016   (GB) .................................. 1602095.0

(51) Int. Cl.
*B62J 7/04* (2006.01)
*B62J 7/08* (2006.01)
(Continued)

(52) U.S. Cl.
CPC . *B62J 7/04* (2013.01); *B62J 7/08* (2013.01); *B62J 9/001* (2013.01); *B62K 2025/025* (2013.01); *B62K 2206/00* (2013.01)

(58) Field of Classification Search
CPC ..... B62J 7/04; B62J 7/08; B62J 9/001; B62K 2025/025; B62K 2206/00
(Continued)

(56) References Cited

U.S. PATENT DOCUMENTS 4,429,818 A * 2/1984 Patterson .................... B62J 7/04
224/422
4,666,071 A * 5/1987 Irwin ......................... B62J 7/04
224/422
(Continued)

FOREIGN PATENT DOCUMENTS

CN      204452691 U    7/2015
DE    202006014301 U1   11/2006
DE    202008000629 U1    4/2008

OTHER PUBLICATIONS

International Search Report for PCT/GB2017/050289; dated Apr. 26, 2017; 3 pgs.

*Primary Examiner* — Corey N Skurdal
(74) *Attorney, Agent, or Firm* — Gardner Groff & Greenwald, PC (57) ABSTRACT

A cycle carrier structure mounted on a cycle comprises an integral bifurcated structure comprising a pair of limbs which are connected at their ends to complementary projections (6, 13) mounted on the ends of a skewer (12) by way of quick release connectors. The bifurcated structure (1) is pivotably connected at the interconnection between the limbs to one end of an adjustable strut (2). The strut (2) is connected at its other end to a seat post (10) by a quick release coupling (3). The bifurcated structure (1) has apertures (7) which can receive a pin (34) of a pannier (29) to secure the pannier (29) to the carrier frame (1). A hook (36) engages a limb of the bifurcated structure (1) to provide additional stability. The bifurcated structure (1) may be an integral component, for example a moulded, hollow component of composite material or alloy.

29 Claims, 11 Drawing Sheets

(51) Int. Cl.
*B62J 9/00* (2020.01)
*B62K 25/02* (2006.01)

(58) Field of Classification Search
USPC .................................................. 224/422, 427
See application file for complete search history.

(56) References Cited

U.S. PATENT DOCUMENTS 5,803,329 A * 9/1998 Weissenberger ........... B62J 7/04
224/422
6,796,575 B2 9/2004 Humes

* cited by examiner

CYCLE CARRIER STRUCTURE

FIELD OF THE INVENTION

The present invention relates to a cycle carrier structure and is particularly although not exclusively concerned with such a structure for use in a system for carrying cargo upon a bicycle. In a specific embodiment it relates to a bicycle rack and pannier system which can be quickly attached and detached and yet is rigid enough to carry significant loads.

BACKGROUND OF THE INVENTION

Bicycle cargo carrying racks, also known as pannier racks, luggage racks or carrier racks are ubiquitous cycling accessories used all over the world. They come in various different forms and are often positioned over either the front or rear wheel.

The purpose of a cargo rack is to allow a cyclist to carry cargo upon the frame rather than on their person. Cargo racks are generally shaped to allow cargo to be carried either in the form of a pannier pack or directly upon the rack.

The design of a cargo rack must consider many different functional aspects. These include:
   What range of bicycles it can connect to
   How the rack connects to the bicycles
   How the rack connects pannier bags
   What load it is capable of carrying
   How the rack is stored pre-purchase or post-purchase During use, the forces that are transmitted through the rack and on to the bicycle can be considerable. There may be vertical loads whilst overcoming bumps in the road, front to rear loads experienced during acceleration and deceleration and finally lateral loads as the user swings the bicycle whilst pedalling. If a load is not rigidly connected to the frame it may sway therefore making it more difficult to control the bicycle. The stiffness and strength of a cargo rack and the rigidity of the connection therefore has a serious impact on ride quality. It is this primary function that therefore defines the form of existing cargo racks.

Rear cargo racks can be generalised in to two different categories—those which mount to the frame and those that mount only to the seat post. The former tends to be a truss-like structure with multiple connection points whilst the latter is a cantilevered structure.

U.S. Pat. No. 4,154,382, issued May 15, 1979 and entitled "Bicycle Rack" describes and illustrates a cargo rack manufactured from welded, bent rod which is strong, stiff and terminates in appropriate connection points that result in a rigid truss like structure.

Truss like cargo racks are designed to mount to the frame and do so usually by connecting to four locations with the use of threaded fasteners. The two lower locations are usually on the frame 'dropouts'. The upper two locations are usually on the seat stays or tube. These types of cargo racks are popular because they have a high load limit and are inexpensive. However these racks also have various drawbacks:
   They require tools to secure the rack which, in turn, precludes them being considered 'quick-release'
   They require the frame to have the necessary mounting points and threaded holes
   To achieve a rigid structure the rack is often welded in the final shape which is bulky and does not transport or store easily
   If a frame does not have the necessary upper mounting points then there are various methods to create fixation points. One option is to use pipe clamps, U-bolts, P-clips and the like upon the seat stays. Another method is to use a seat clamp with additional protrusions and threaded holes. While these means for attaching accessories to a bicycle do have utility, the drawbacks are numerous:
   Still requires tools to attach
   Excess weight
   May be considered unsightly
   If a member of a bicycle frame is not in an assumed orientation or where the frame member is of a different size or shape attachment may not be possible
   When used on frames manufactured from a carbon-fiber composite then damage can occur with incorrect clamping forces If a frame does not have the necessary, lower mounting points then there are also various solutions. The first solution is to thread the skewer through the lower mounting holes of the rack. Another options is the use additional plates that are sandwiched either side of the frame with the skewer. These plates contain threaded holes to allow attachment. These solutions have some of the following negative points:
   Protrusions on the frame can cause an interference stopping assembly
   Different load scenarios can cause undesired stresses on the skewer, frame or rack
   Complex assembly
   Excess weight US Patent Number US2012/0168479, issued Jul. 5, 2012 and entitled "Cantilever bike rack" describes and illustrates a cargo rack manufactured from a combination of welded rod & tube which terminates at the seat tube that results in a cantilevered structure.

The benefit of a seat-post mounted cargo rack is the ability to mount to almost any bicycle although usually this is dependent on the bicycle having a round seat-post. There are however various downsides:
   They have a limited ability to carry heavier loads due to concerns around frame, seatpost or seat damage
   Cantilevered structures can be heavier than truss-like structures when comparing them in a like-for-like weight carrying scenario
   The connection to the seat-post must be extremely secure to stop side to side slip therefore the usually results in a bulky clamp-like assembly Finally, whatever the type of cargo rack that is utilized it is usually expected that a pannier bag will attach to a substantially horizontal member upon the rack. U.S. Pat. No. 5,673,833, issued 7 Oct. 1997 and entitled "Device for holding bags on bicycles, motorcycles and the like" describes and illustrates a method for securing a bag to a rail of a cargo rack. The attachment method as described in the patent are acknowledged to be of high quality, however, there various disadvantages.
   Must have at least two points of contact separated by a distance
   Dictates that the cargo rack must have a horizontal member
   The horizontal member must be substantially round
   If the horizontal member is not the correct diameter, then there will be a loose fit to the pannier
   Although the fastening rail is rigid the connection the bag itself is not

SUMMARY OF THE INVENTION

According to the present invention there is provided a cycle carrier structure for a cycle, the carrier structure comprising a carrier frame provided with securing means for receiving a load carrier to be secured to the carrier structure, the carrier frame having a lower attachment mechanism for attachment to a counterpart projection at a lower region of a cycle frame and an upper attachment mechanism for attachment to an upper region of the cycle frame, the upper and lower attachment mechanisms comprising quick release mechanisms, the carrier structure further comprising an axle for supporting a hub of a wheel of the cycle, the counterpart projection being provided on the skewer axle so as to project laterally from the cycle frame in use.

In this specification, the expression "quick-release" relates to a mechanism which enables secure coupling and uncoupling of two components by hand only, without the use of tools.

Embodiments in accordance with the present invention provide a cargo rack that is lightweight, strong, stiff, allows quick tool-less attachment and removal, can be attached to a wide range of bicycles irrespective of the frames having built in mounting points and has a rigid connection to a pannier.

The lower attachment mechanism may be adapted for attachment to a substantially cylindrical counterpart projection.

The lower attachment mechanism may have an overcentre action.

The carrier structure may comprise a bifurcated structure having a pair of limbs with free ends, the lower attachment mechanism being one of a pair of lower attachment mechanisms provided respectively at the free ends of the limbs. The bifurcated structure may an integral structure, that is to say the two limbs of the component may be constructed as a single component. The cycle carrier structure and the axle may form a closed or hoop-like structure.

The upper attachment mechanism may be adapted for quick release attachment to a seat post of the cycle frame. The upper attachment mechanism may, for example, comprise a hand-tightened screw mechanism.

In an embodiment in which the carrier structure is a bifurcated structure, the upper attachment mechanism may be connected to an interconnecting region of the bifurcated structure at which the limbs are interconnected to each other. The upper attachment mechanism may be connected to the interconnecting region by a strut having an adjustable length, in which case the strut may be pivotably connected to the bifurcated structure. Locking means may be provided for locking the strut in an adjusted position.

The or each lower attachment mechanism may be situated at or adjacent to the rotational axis of a wheel of the cycle, which may be the rear wheel of the cycle.

If the carrier is a bifurcated structure, the counterpart projection may be one of two counterpart projections situated at opposite ends of, and coaxial with, the skewer.

In an alternative embodiment, the or each counterpart projection may be secured to a frame member of the cycle adjacent the rotational axis of the wheel.

The securing means for receiving a load carrier may comprise a projecting element which projects from the cycle carrier structure. The projecting element may extend substantially parallel to the intended direction of travel of the cycle. The projecting element may be provided on one of the limbs of the bifurcated structure. The projecting element may be one of a pair of aligned projecting elements projecting to opposite sides of the respective limb. The load carrier may comprise a latching mechanism having a pair of latches for respectively engaging the aligned projecting elements, the latching mechanism having a common manual actuator for actuating both of the latches.

The respective limbs of the bifurcated structure may each be provided with a said projecting element or a said pair of projecting elements.

The or each projecting element may comprise a pin which is received in a respective aperture for the mounting of a load carrier extending through the cycle carrier frame. The pin may be provided with locking means for securing the pin within the aperture.

The cycle carrier structure or cycle may be provided with a load carrier secured to the carrier structure by the securing means. The securing means may comprise an aperture, in which case the load carrier may be provided with a pin received in the aperture. The pin may be provided with locking means for securing the pin within the aperture. The pin may be mounted on a rigid mounting plate of the load carrier.

The load carrier may be provided with a stabilising element which is spaced from the securing means and engages the cycle carrier structure for restraining the load carrier against rotation about the pin or the projecting element. The stabilising element may engage one of the limbs of the bifurcated structure and may comprise a hook.

Another aspect of the present invention provides a cycle provided with a cycle carrier structure as defined above.

The load carrier may comprise a pannier.

With this method a rigid connection between pannier and rack can be created. The pin includes features that allow it to remain locked in place.

To allow the use of existing panniers an alternative pin can be fitted in the coupling hole providing a nominally horizontal round member to attach existing panniers to.

An alternative arrangement may be used to mount the pannier rigidly to the main support structure which is effectively the inverse of what is described above whereby the main support structure has projecting elements or protrusions emanating that will slot in to the pannier.

Another aspect of the present invention provides a kit of parts comprising a cycle carrier structure which is a bifurcated structure having a pair of limbs with free ends, the lower attachment mechanism being one of a pair of lower attachment mechanisms provided respectively at the free ends of the limbs, and an axle provided with counterpart projections for engagement with the lower attachment mechanisms, whereby when the lower attachment mechanisms engage the counterpart projections, the carrier structure and the axle form a closed structure.

Another aspect of the present invention provides a cycle carrier structure provided with securing means for receiving a load carrier to be secured to the carrier structure, the carrier structure having a lower attachment mechanism for attachment to a lower region of a cycle frame and an upper attachment mechanism for attachment to an upper region of the cycle frame, the upper and lower attachment mechanisms comprising quick release mechanisms, the carrier structure comprising a bifurcated structure having a pair of limbs with free ends, the lower attachment mechanism being one of a pair of lower attachment mechanisms provided respectively at the free ends of the limbs, the bifurcated structure being an integral structure of which the two limbs are constructed as a single component.

In one embodiment in accordance with the present invention, the structure includes a bifurcated main support member that is an inverted U or V shape that terminates in two coupling points. A bicycle wheel axle or skewer is designed to attach the wheel to the frame of a bicycle, however, within the present invention the wheel skewer has been redesigned with features that allow a rigid connection to the coupling points of the main support member. Once the main support member is connected to the specifically designed bicycle wheel skewer it creates a complete closed structure, which can be regarded as a modified O-shape that is inherently stiff and rigid unlike existing truss like racks which connect directly to the frame to create stiffness.

The coupling point from the main support member to the skewer is of importance. The bicycle wheel skewer is designed in a traditional manner with a long bolt, nut and a cam lock for quick-release, however, notably, the skewer has mounting points that are rotationally symmetric that protrude beyond the length of the assembly. The coupling at the end of the main support member is designed primarily to ensure the connection is stiff and rigid. The second priority is that it can be connected and disconnected without the use of tools, which is achieved in one embodiment by using a latching or cam mechanism.

Beyond the stiffness advantage, since the majority of bicycles use skewers to attach the rear wheel to the frame this newly designed rack with its specifically designed skewer can now fit a much wider range of bicycles irrespective of whether they come with frame mounting points.

Connecting the main support member via the skewer provides a rigid connection to lateral forces however an additional support member is required to stop the modified O-shape rotating around the wheel axis. Therefore, the support frame has a secondary member emanating from the apex of the bifurcated structure. The secondary member protrudes forward towards the seatpost. The bifurcated main support member combined with the member at the apex makes the assembly resemble an inverted Y shape when detached from the bicycle. As mentioned the lower two points connect to the specifically designed skewer. The end of the member protruding from the apex is designed to attach to the seatpost thus stopping the assembly from rotating around the skewer axis. This upper connection takes minimal loads in comparison to the loads at the lower connection points. The mechanism is designed to rigidly attach to seatposts of varying diameters and shapes without the use of tools. Thus using three connection points, that can all be detached without the use of tools the rack can quickly and easily removed from the bicycle.

The member emanating from the apex of the support frame may be telescopic which further improves the likelihood of fitting as wide a range of bicycles as possible.

BRIEF DESCRIPTION OF THE DRAWINGS

For a better understanding of the present invention and to show more clearly how it may be carried into effect, reference will now be made, by way of example, to the accompanying drawings, in which.

DESCRIPTION OF THE PREFERRED EMBODIMENTS

The embodiment shown in the drawings is a rear cargo rack, but some of the features can be applied in the design and manufacture of a front cargo rack.

Figure 1:
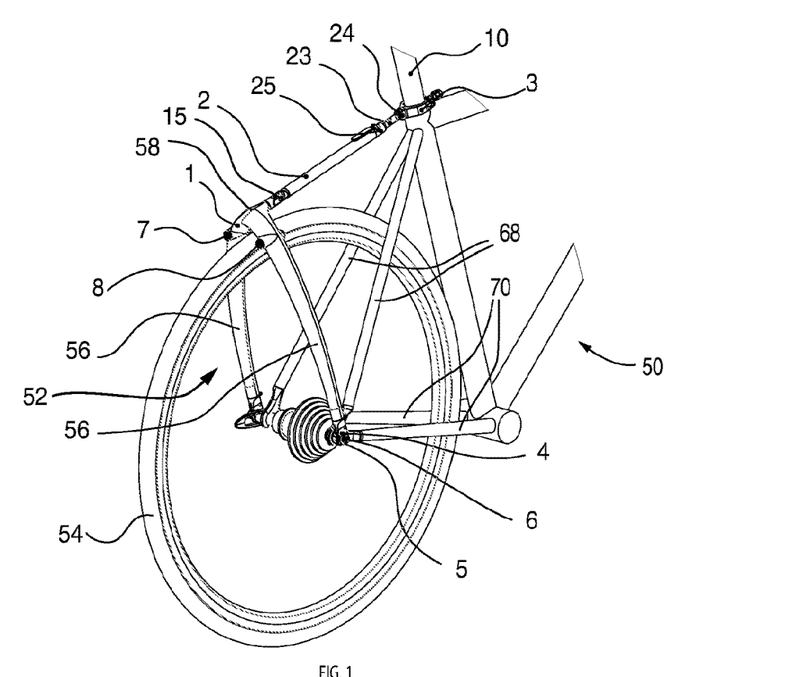
FIG. 1 is a perspective view of the rear part of a bicycle provided with a rack and quick release skewer mounted to a frame of the bicycle

Referring to the drawings, FIG. 1 shows a bicycle 50 with a cargo rack 52 connected at the rear wheel 54 of the bicycle 50. The cargo rack 52 comprises a main support member in the form of a bifurcated carrier frame 1 which is generally an inverted U or V shape having two limbs 56 interconnected at an apex 58. The limbs 56 are slightly bowed outwards of the wheel 54, and the apex 58 has a relatively small radius curve passing close to the wheel 54. The bifurcated structure 1 may be an integral component, for example a moulded, hollow component of composite material or alloy.

As shown in FIG. 1, the structure 1 has a smooth shape, with the limbs 56 flowing smoothly from one to the other around the apex 58.

The carrier frame 1 contains two through holes 7 & 8 at the upper end of each limb 56, close to the apex 58, that allow a rigid connection to this member for load bearing as will be discussed below.

Figure 9:
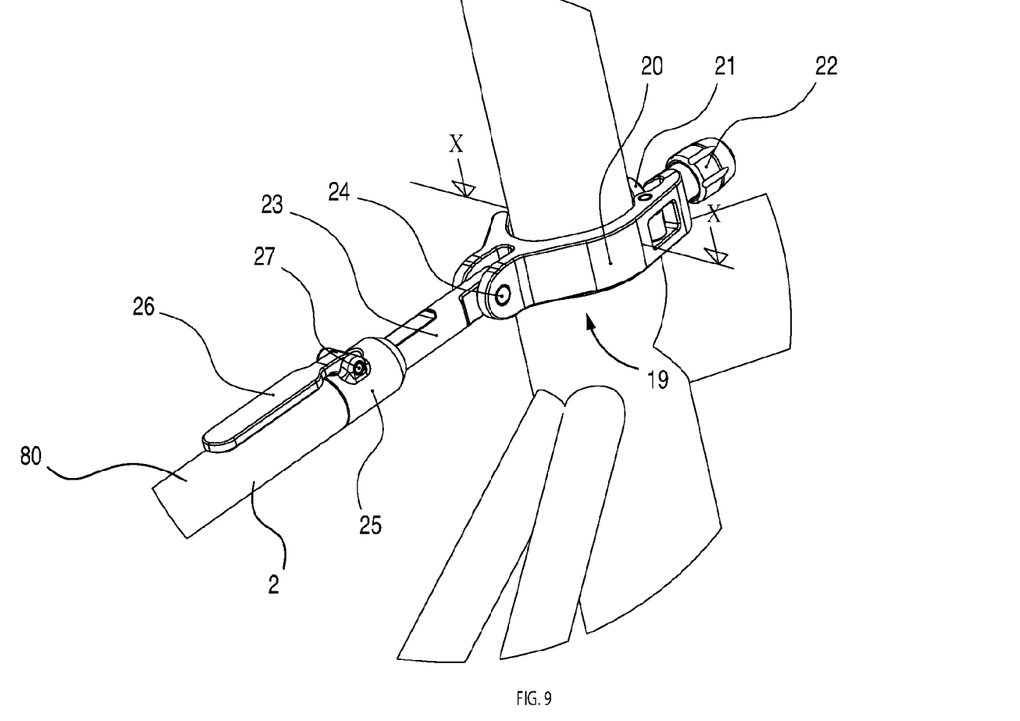
FIG. 9 is a partial perspective view of a seat post connector of the embodiment of FIG. 1
Figure 10:
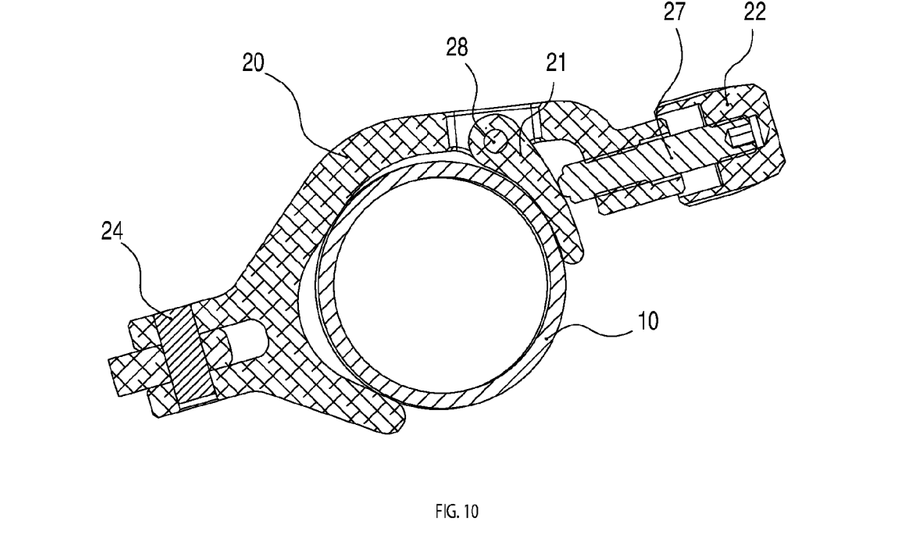
FIG. 10 is partial cross sectional view taken generally along the line X-X in FIG. 9

The apex 58 of the carrier frame 1, i.e. the interconnection between the limbs 56, has a boss 66 which protrudes forward towards front of the bicycle 50 and is connected by a pivot 15 to an upper attachment mechanism in the form of an adjustable telescopic strut 2 which is connected by a pivot 24 to a seatpost connector 10 as shown in more detail in FIGS. 9 and 10.

The end of each limb 56 of the bifurcated carrier frame 1 away from the apex 58 terminates in a lower attachment mechanism in the form of a skewer connector 4 that allows a rigid connection to a companion quick release skewer 12 which serves as an axle for the wheel 54, and supports the wheel 54 on each side of the bicycle frame, at the respective junctions between each seat stay 68 and chain stay 70. The skewer 12 is non-standard, and is specifically designed with protrusions 6, 13 at each end. To make alignment as easy as possible these protrusions are axially symmetric. The carrier frame 1 can be locked in place on the protrusions 6, 13 utilizing lower attachment mechanisms in the form of over-centre action skewer connector latches 5.

Figure 2:
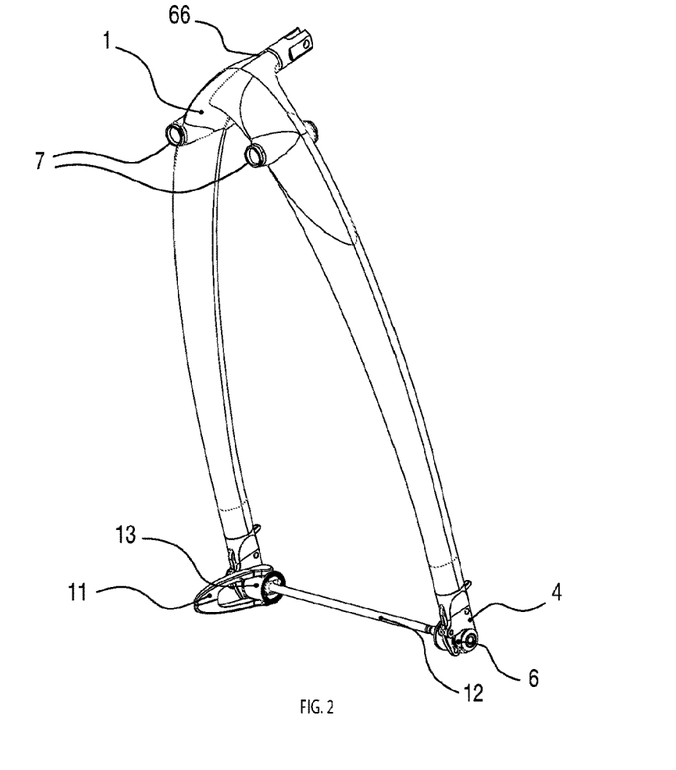
FIG. 2 is a perspective view of the rack and quick release skewer only

Once the bifurcated carrier frame 1 is secured to the skewer mounting protrusions 6, 13 a rigid modified O-shaped, or hoop-like, carrier structure has been formed. This structure is designed to be inherently stiff independently of the bicycle frame that it is mounted to. FIG. 2 shows this O-shaped structure isolated from the bicycle 50. This is a design innovation previously not seen in existing racks.

The strut 2 protruding towards and connecting to the seatpost 10 prevents rotation of the rigid O-shape around the wheel axis. The majority of lateral and vertical forces applied to the structure 1, for example at the through holes 7, are taken by the O-shape assembly and the majority of front to rear forces are taken by the strut 2 connected to the seatpost 10.

The strut 2 comprises a sleeve 62 within which an internally telescoping rod 23 is slidable. The rod 23 can be locked at a selected position within the sleeve 62 by a locking mechanism 26 to establish a desired position of the carrier structure 52 about the axis of the wheel 54 so as to allow the assembly to be adjusted to fit different frame sizes.

Figure 3:
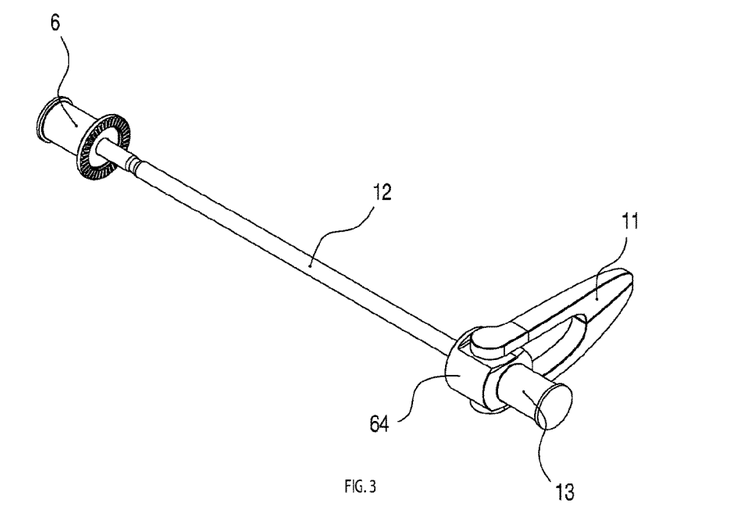
FIG. 3 is a perspective view of the quick release skewer

The novel quick release skewer 12 is shown in FIG. 3. The skewer 12 serves as an axle for the bicycle wheel 54. The skewer 12 is provided with a lever 11 so that the skewer can be turned within a cam block 64 to adjust the length of the skewer 12 so as to clamp the skewer 12 under tension between the two sides of the frame of the bicycle 50. When at the desired length (to provide the desired tension), the lever can be pivoted to lock the skewer in position. The novel area of interest on this assembly relates to the protrusions 6 & 13 that allow the carrier frame 1 to connect to the skewer 12 rigidly and therefore to be mounted to any bicycle frame regardless of whether or not the frame has mounting holes.

Figure 4:
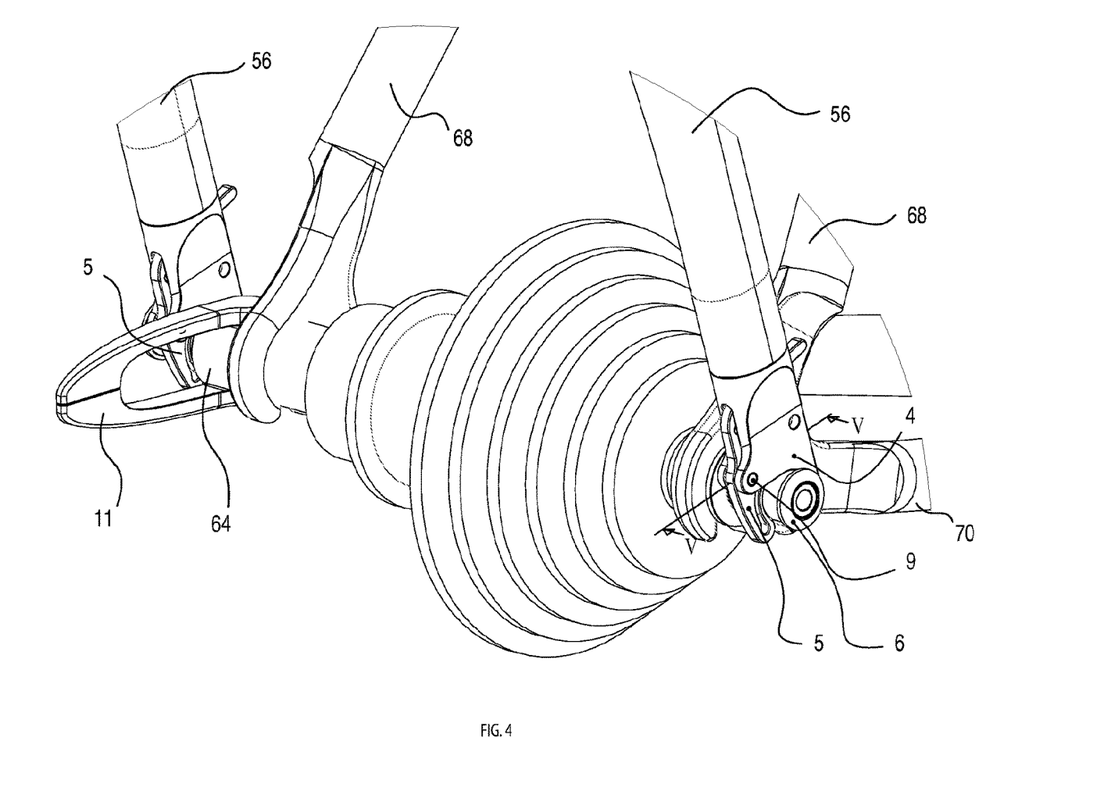
FIG. 4 is an enlarged view of part of FIG. 1 showing a latch mechanism between the rack and the skewer

FIG. 4 is a detailed perspective view showing how the carrier frame 1 connects to the skewer 12 and then to the bicycle frame. The skewer connector 4 is provided with a connector latch 5 which is mounted rotatably on the connector 4 by a pivot pin 9 allowing quick connection and release to the skewer protrusions 6 & 13 without the use of any tools.

Figure 5:
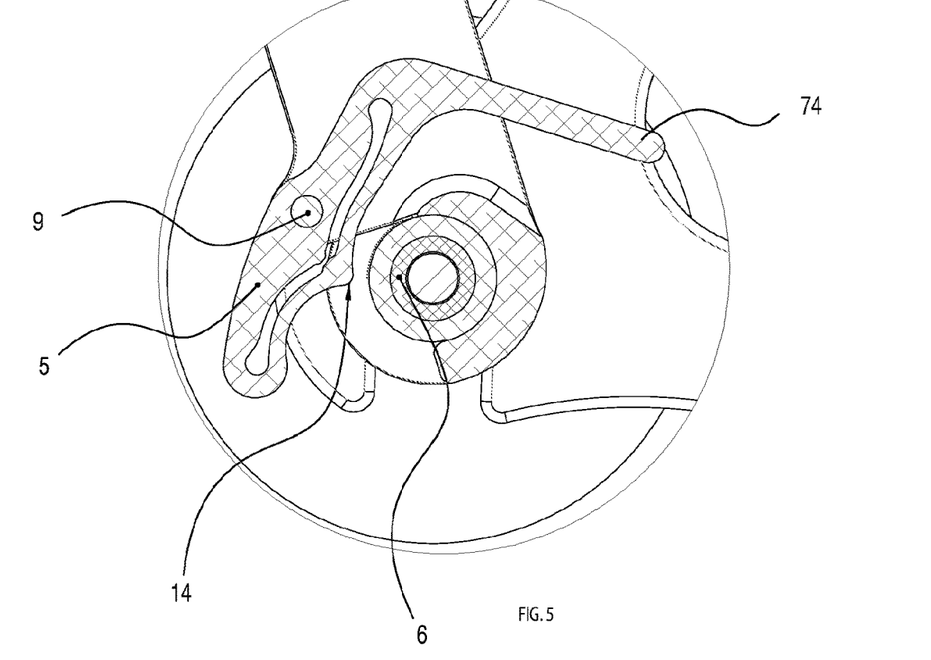
FIG. 5 is a partial cross sectional view taken generally along the line V-V in FIG. 4 with the latch mechanism in the open position FIG. 6 corresponds to FIG. 5 but shows the latch mechanism in the closed position FIG. 7 corresponds to FIG. 4 but shows an alternative form of latch mechanism
Figure 6:
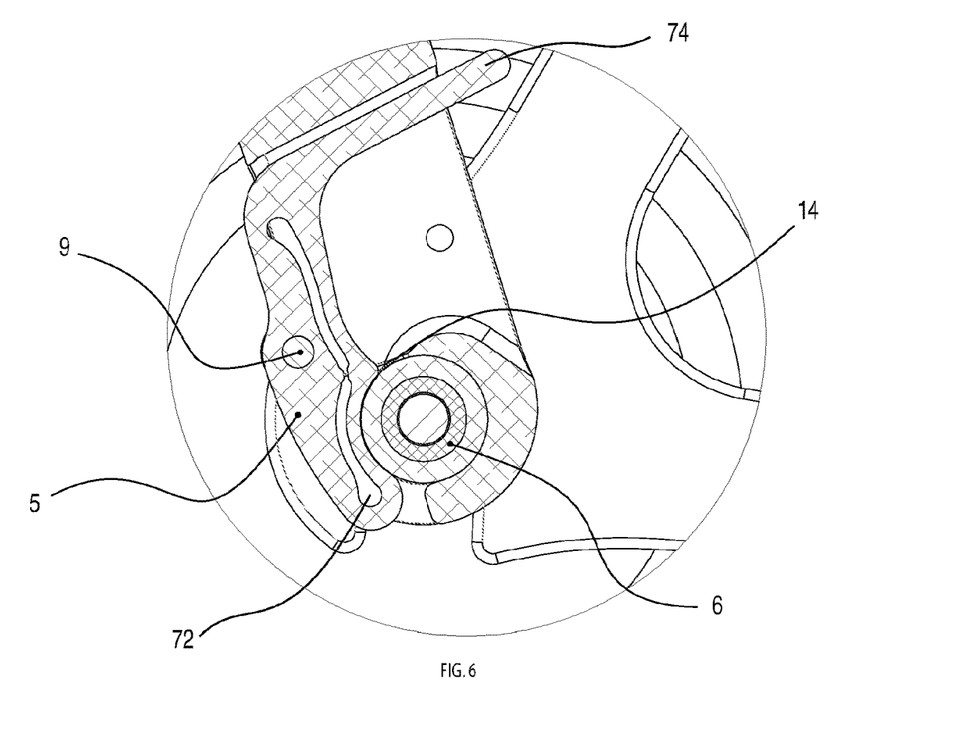

FIGS. 5 & 6 are cross sectional views taken generally at a plane containing the line V-V in FIG. 4 and lying parallel to the lengthwise axis of the limb 56. The connector latch 5 is formed of a resilient material and includes a cavity 72 which enables the latch 5 to compress between the pivot pin 9 and the protrusions 6 (or 13) of the skewer 12. The connector latch 5 has a handle portion 74 which a user can manipulate to turn the latch 5 about the pivot pin 9. A nose 14 on the latch 5 travels over the surface of the adjacent protrusion 6, 13 as the latch turns about the pivot pin 9. During latching and unlatching of the skewer connector latch 5 the nose 14 must rise up and over the diameter of the skewer protrusion 6, 13. The nose 14 effectively acts as an over-centre cam profile that locks the member on to the quick release skewer. FIG. 5 represents the latch in the open position whilst FIG. 6 represents the latch in the closed and therefore locked position.

Figure 7:
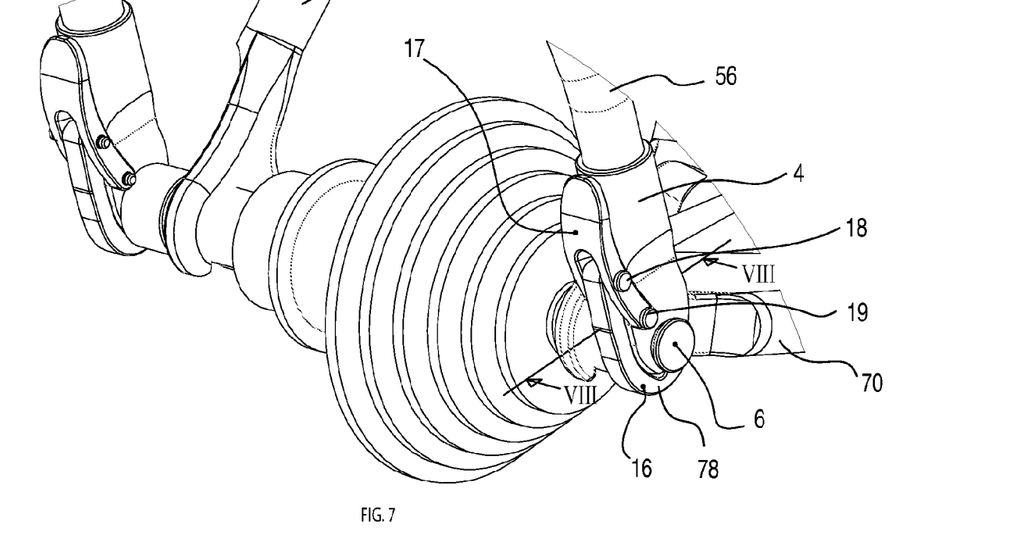

FIG. 7 is a perspective view of a different embodiment of the lower attachment mechanism for locking the carrier frame 1 to the protrusions 6, 13 on the quick release skewer 12. This embodiment again utilizes an 'over-centre' approach. A lever 17 is pivotably connected to the skewer connector 4 at a pivot pin 19 and a connector latch 16 having a hook portion 78 is pivotably connected to the lever 17 at a pivot pin 18. In operation, movement of the lever 17 to the latched condition causes the hook portion 78 to be drawn up into firm contact with the protrusion 6, 13. During this travel, the hook portion 78 is flexed to lock the carrier frame 1 to the protrusion.

Figure 8:
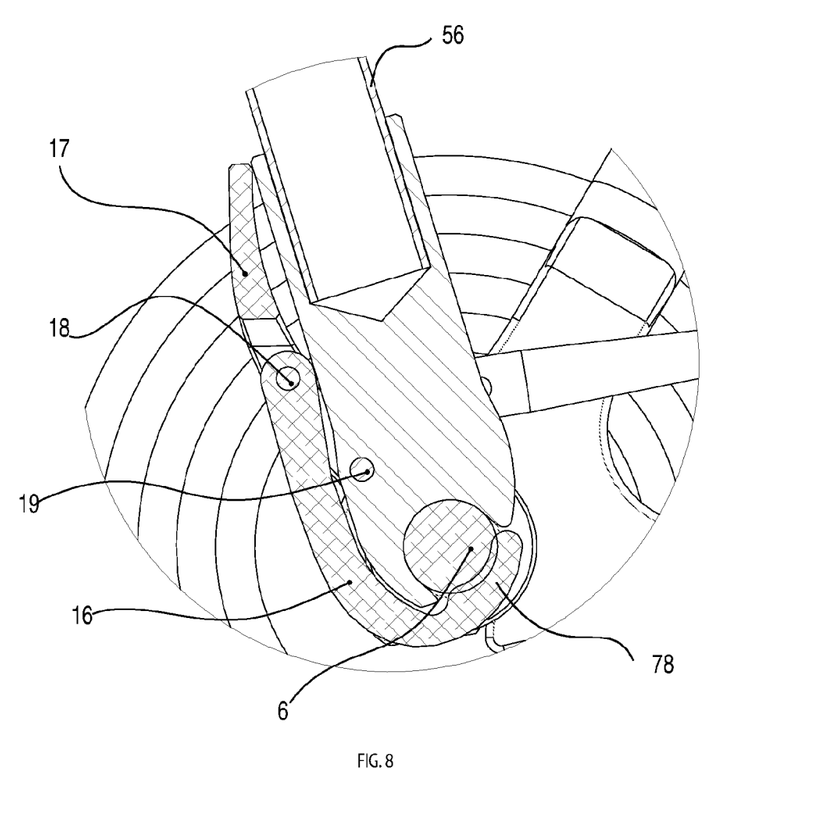
FIG. 8 is partial cross sectional view taken generally along the line VIII-VIII in FIG. 5

FIG. 8 illustrates a cross sectional view of the over centre mechanism of FIG. 7 taken generally at a plane containing the line VIII in FIG. 7 and lying parallel to the lengthwise axis of the limb 56. In this arrangement it is possible to see the pivots 18 & 19 that are in line with the latch 16 to keep it flexed and therefore in tension.

FIGS. 9 and 10 show the region of the seatpost 10 illustrating the connection between the telescopic strut 2 and the seat post 10. The telescopic strut 2 terminates at a seatpost connector 19 which comprises a support structure 20 to which a clamping lever 21 is pivotably connected at a pivot 28. A knob 22 provided with a screwthreaded shank 27 is mounted on the support structure and can be turned by hand to press the lever 21 against the seat post 10. The telescoping mechanism comprises a sleeve 80 in which a telescoping rod 23 can slide. The sleeve 80 terminates at a support structure 25 which carries a lever 26 that rotates around a pivot 27 with a cam feature that clamps tightly to the internal telescoping rod 23 to fix the adjusted length of the strut 2.

FIG. 10 is a cross sectional view of the seat post connector 19 taken generally along the line X-X in FIG. 9. It is possible to see how when the knob 22 is rotated it in turn moves the screwthreaded shank 27 towards the seatpost 10 which in turn moves the lever 21 around the pivot 28 thus clamping the seat post securely between 3 different points.

Figure 11:
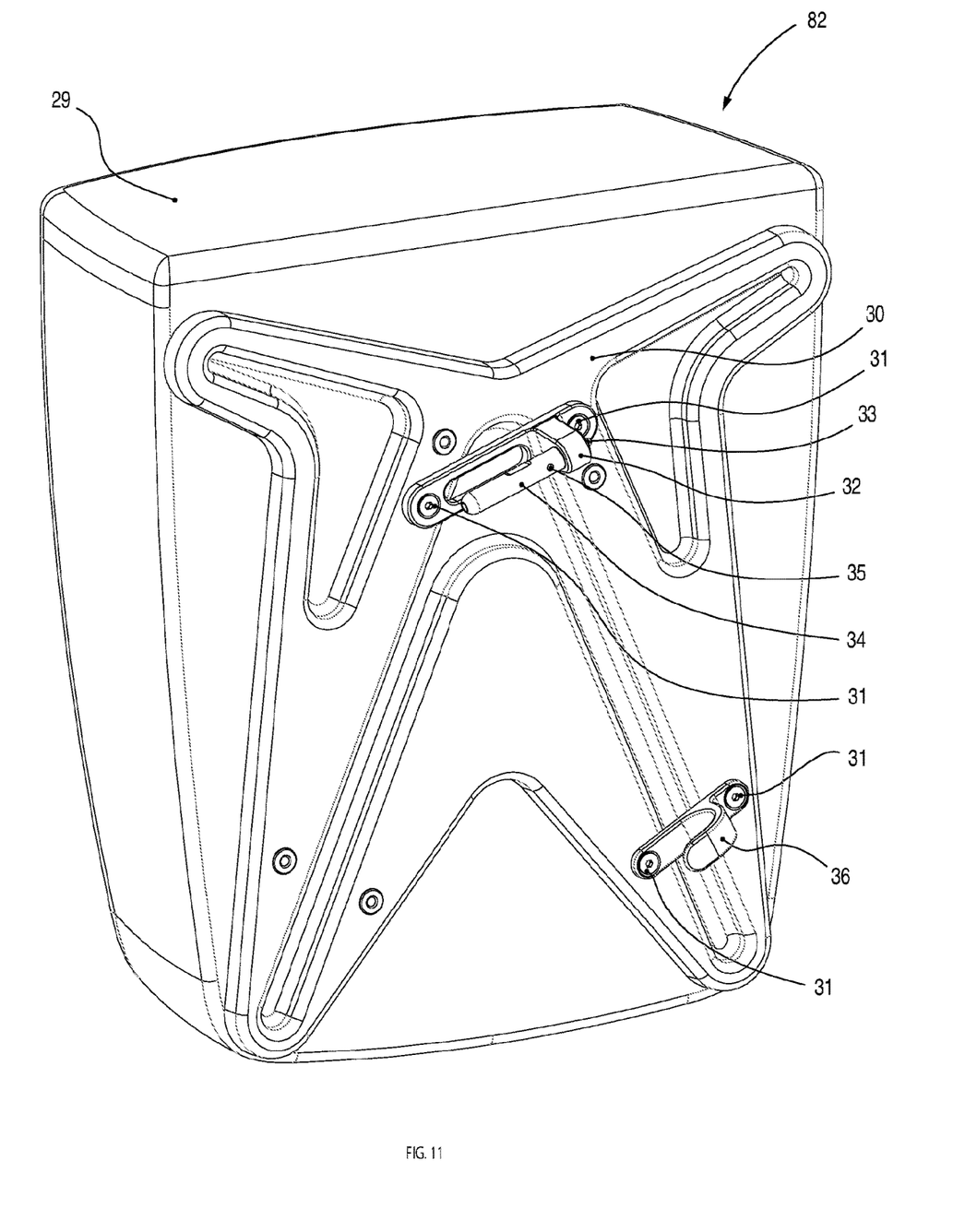
FIG. 11 is a perspective view of a pannier for mounting on the rack of FIG. 1

FIG. 11 is a perspective view of a pannier 82 that can be attached to the cargo rack illustrated in the previous Figures. The pannier 82 comprises a bag 29 which is connected to a rigid pannier plate 30 which in turn is connected to a pannier support connector 32. The pannier support connector 32 carries a pannier connector shaft 34. There is a locking feature 35 similar to that mentioned below with reference to FIGS. 14, 15 & 16 that can be released by pulling on the shaft 35. Also connected to the rigid pannier plate 30 is a hook 36 that stops rotation around the shaft 34 when the pannier 82 is fitted to the carrier frame 1.

Figure 12:
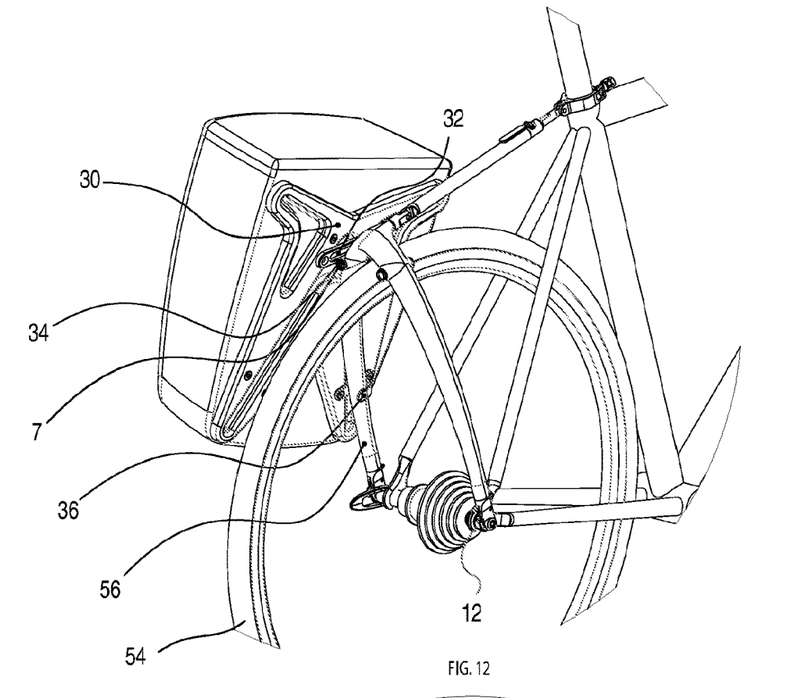
FIG. 12 is a perspective view showing the pannier mounted on the rack

FIG. 12 is a perspective view of the cargo rack 52, the pannier 82 and the quick release skewer 12 mounted to the bicycle frame 50. Notably it is possible to see how the pannier connection shaft 35 is coupled the bifurcated carrier frame 1 via the through hole feature 7 and the hook 36 engages the seat stay 68.

Figure 13:
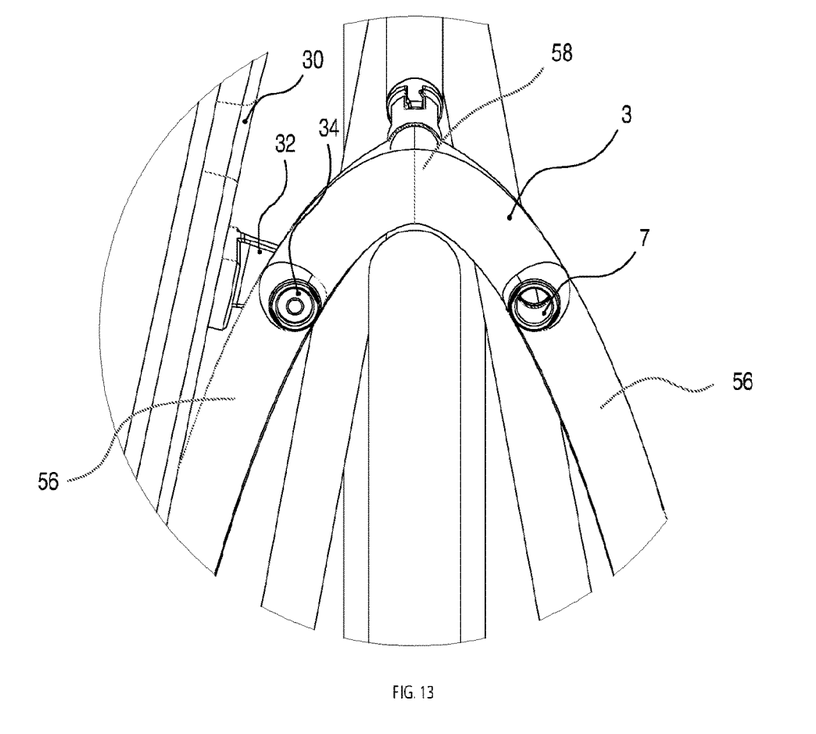
FIG. 13 is a partial rear elevation view of the rack and the pannier of FIG. 12

FIG. 13 is a partial rear elevation view of the coupling area between the bifurcated carrier frame 1 and the pannier plate 30 for clarity.

Figure 14:
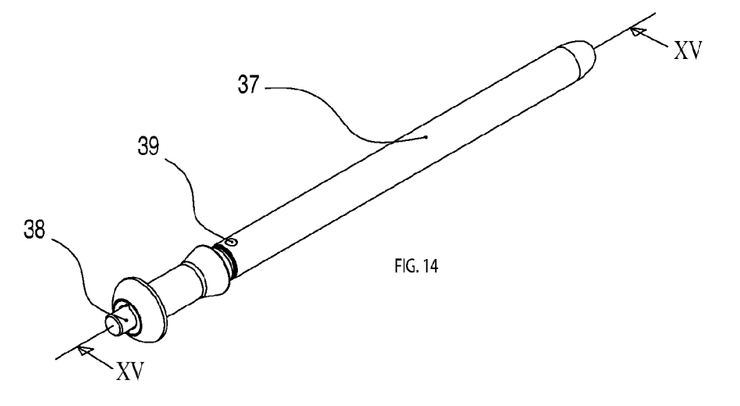
FIG. 14 is a perspective view of the pin for enabling connection of existing panniers to the rack
Figure 15:
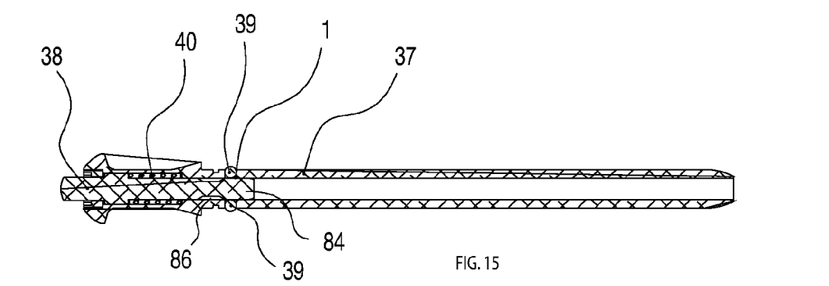
FIG. 15 is a cross sectional view of the pin taken generally along the line XV-XV in FIG. 14 in the locked configuration FIG. 16 corresponds to FIG. 15 but shown the pin in the unlocked configuration

FIG. 14 is a perspective view of a pin assembly that allows connection to the carrier frame 1 of existing panniers provided with hooks or other fittings intended to fit over horizontal bars or the like of conventional cargo racks. It comprises a shaft 37 and two ball bearings 39 protruding through openings at opposite sides of the shaft 37. An internal shaft 38 serving as a release button is displaceable against the action of a spring 40 from a position shown in FIG. 15 to a position shown in FIG. 16. In the position of FIG. 15, a boss 84 is situated between the ball bearings 39 to force them outwardly of the openings in which they sit. In the position shown in FIG. 16, the shaft 38 is displaced against the spring 40 inwardly of the shaft 37 to bring a circumferential recess 86 into alignment with the ball bearings 39. This allows the ball bearings 39 to move inwardly with respect to the shaft 37. Thus, in the position shown in FIG. 15, the ball bearings 39 can engage a recess 41 (see FIG. 18) in the through bore 7 to lock the pin assembly into the bore. When the shaft 38 is displaced against the spring 40, the ball bearings 39 are released so that they can retract inwardly of the shaft 37 to allow the pin assembly to be withdrawn.

FIG. 15 illustrates a cross sectional view taken generally along the line XV-XV in FIG. 14 in the locked configuration. It can be seen that the internal release button 38 is contoured so that two ball bearings 39 are pushed beyond the external diameter of the external shaft 37. The spring 40 is designed so this is the normal case.

Figure 16:
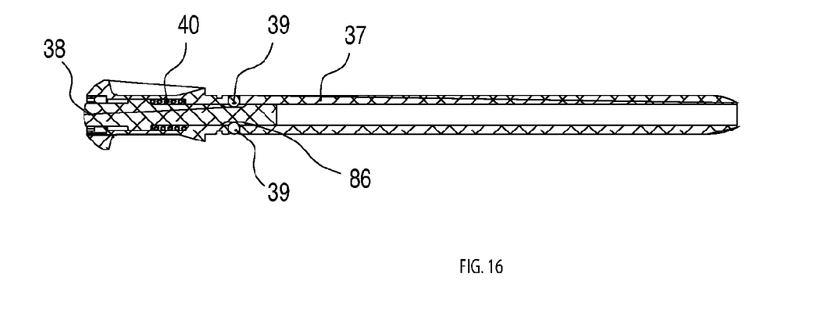

FIG. 16 illustrates a cross sectional view taken generally along the line XV-XV in FIG. 14 in the unlocked configuration. When the internal release button is depressed, compressing the spring 40, the ball bearings have freedom move radially inwards so that they no longer protrude beyond the external diameter of the external shaft 37.

Figure 17:
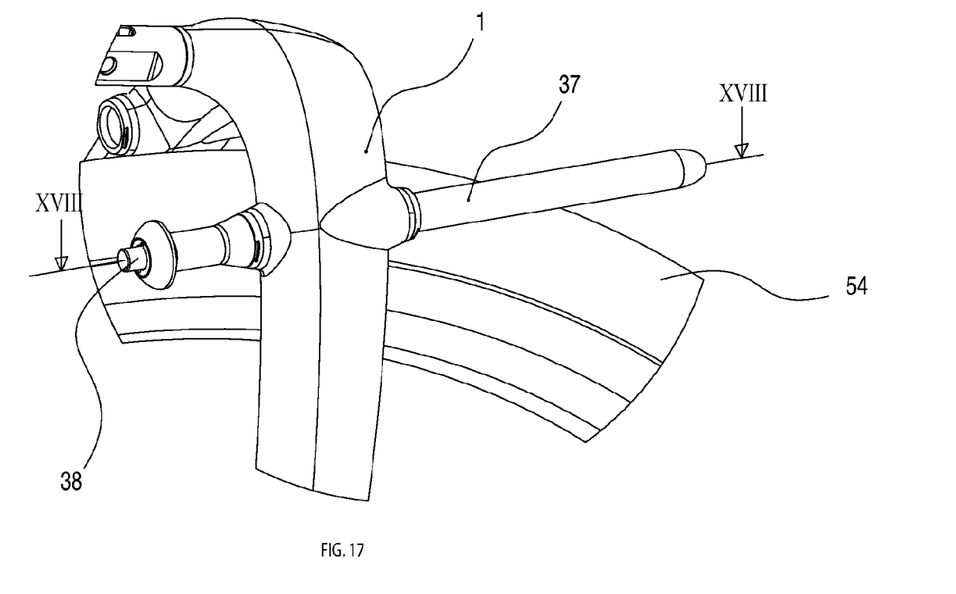
FIG. 17 is partial perspective view showing the pin mounted on the rack

FIG. 17 shows the pin assembly mounted to the carrier frame 1. When the external shaft 37 is mounted it provides a projecting element in the form of a horizontal member similar to existing racks to mount existing panniers.

Figure 18:
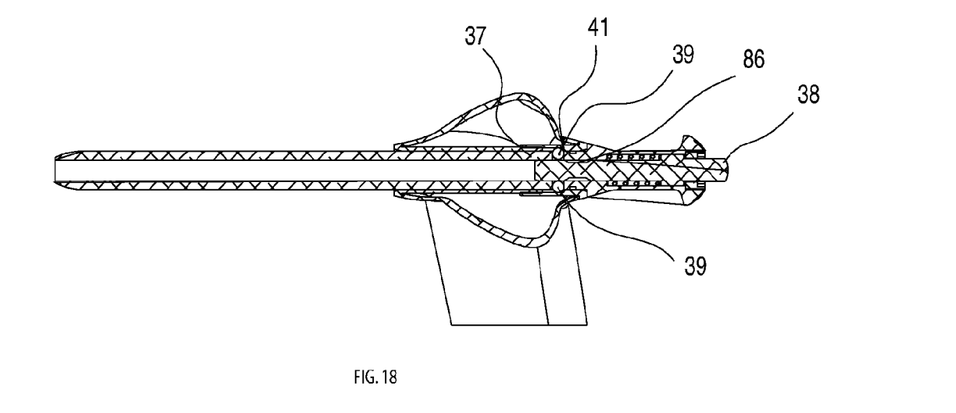
FIG. 18 is a partial cross sectional view taken generally along the line XVIII-XVIII in FIG. 17

FIG. 18 is a partial cross sectional view taken generally along the line XVIII-XVIII in FIG. 17. It is possible to see how the protruding ball bearings interface with the through holes 7 & 8 and are captured by the recess or undercut feature 41 that locks the shaft in place.

Figure 19:
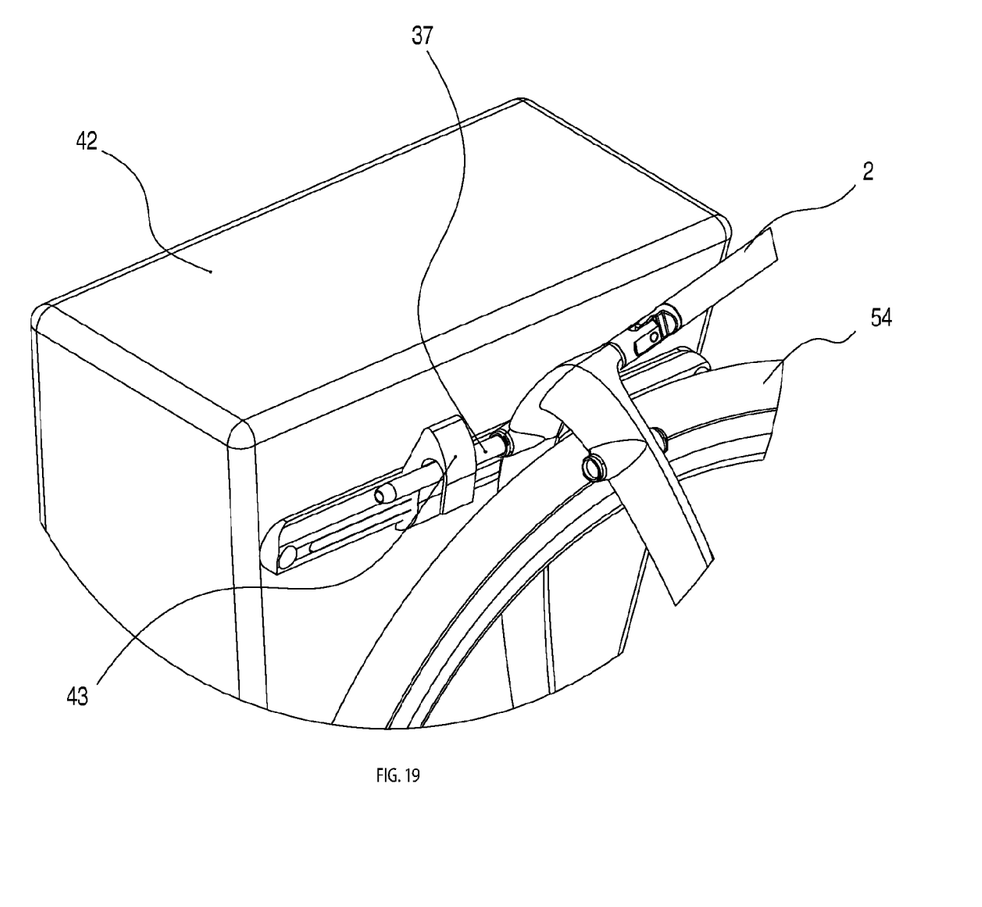
FIG. 19 is a partial perspective view showing an existing pannier attach by means of the pin of FIGS. 17 and 18

FIG. 19 is a partial perspective view showing an existing pannier 42 attached to the shaft 37 by way of hooks 43 mounted to the pannier 42.

Figure 20:
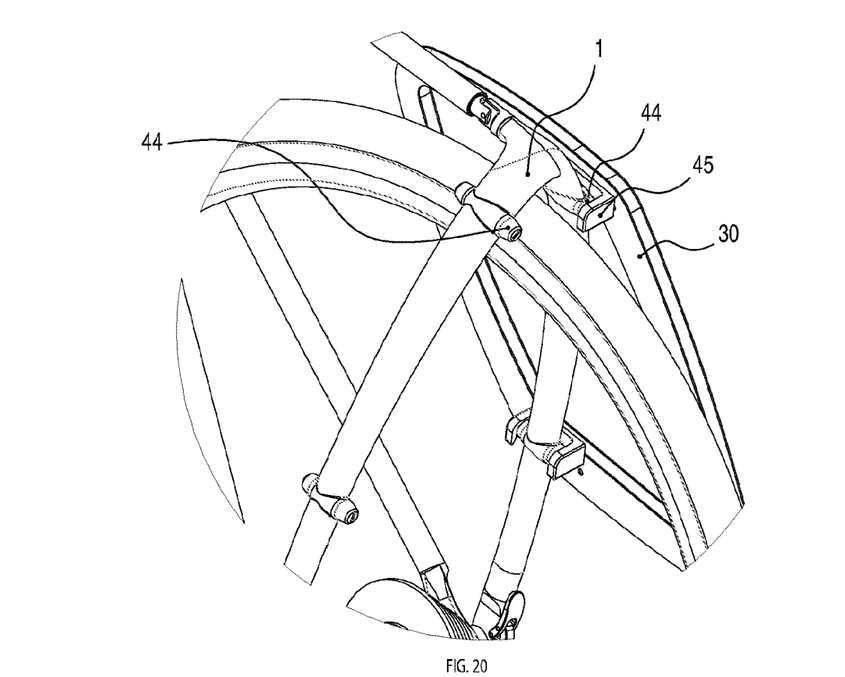
FIG. 20 is a partial perspective view of an alternative arrangement to couple the pannier to the rack
Figure 21:
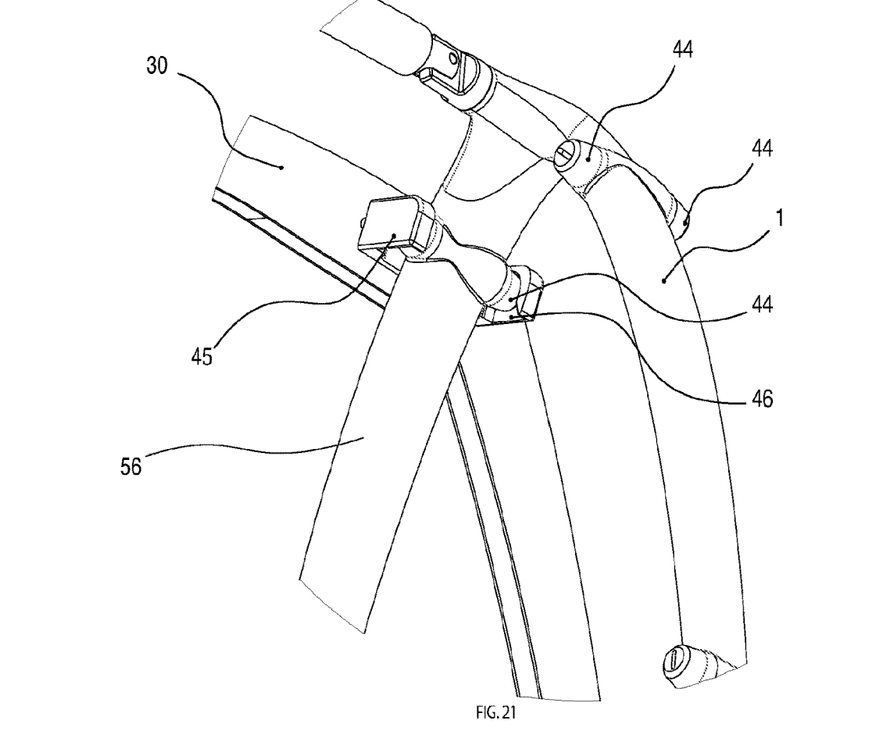
FIG. 21 is a further partial perspective view of the arrangement of FIG. 20

FIGS. 20 and 21 are partial perspective views of an alternative arrangement to connect the pannier support structure 30 to the bifurcated carrier frame 1. In this scenario each limb 56 of the carrier structure 1 contains projecting elements in the form of protrusions 44 that project from opposite sides of the respective limb 56. The protrusions 44 allow a corresponding bracket 45 to be connected. The bracket 45 is provided with a pair of arms 88 which straddle the limb 56 and are provided with grooves 46 which engage the protrusions 44 to provide the rigid connection. In a modified version of the embodiment shown in FIGS. 20 and 21, a latch mechanism may be provided comprising latching elements which engage the protrusions 44 and can be operated by a single manual operating element.

Although the embodiments described above relate to a carrier structure at the rear wheel of a bicycle, it will be appreciated that the present invention may also be applied to a carrier structure over the front wheel of a bicycle, or other similar vehicles, whether motorised or not. Also, it will be appreciated that the lower attachment mechanism does not necessarily need to incorporate an overcentre mechanism. Instead, any mechanism that provides a quick release yet secure fastening to the protrusions 6, 13 will be sufficient. For example, a hook mechanism that can be latched into place around the protrusions 6, 13 with a security measure such as a locking pin which can be manually withdrawn could be employed.

The invention claimed is:

1. A cycle carrier structure for a cycle, the carrier structure comprising a carrier frame and a load carrier comprising a pannier which is adapted to be secured to the carrier frame, the carrier frame having a lower attachment mechanism for attachment to a counterpart projection at a lower region of a cycle frame and an upper attachment mechanism for attachment to an upper region of the cycle frame, the upper and lower attachment mechanisms comprising quick release mechanisms, the carrier structure further comprising an axle for supporting a hub of a wheel of the cycle, the counterpart projection being provided on the axle so as to project laterally from the cycle frame in use.

2. A cycle carrier structure as claimed in claim 1, in which the counterpart projection is substantially cylindrical.

3. A cycle carrier structure as claimed in claim 1, in which the lower attachment mechanism has an overcentre action.

4. A cycle carrier structure as claimed in claim 1, in which the carrier frame comprises a bifurcated structure having a pair of limbs with free ends, the lower attachment mechanism being one of a pair of lower attachment mechanisms provided respectively at the free ends of the limbs and the counterpart projection being one of a pair of counterpart projections at opposite ends of the axle.

5. A cycle carrier structure as claimed in claim 4, in which the bifurcated structure is an integral structure constructed as a single component.

6. A kit of parts for assembly to form a cycle carrier structure as claimed in claim 4, the kit comprising the carrier frame, the pannier and the axle, whereby when the lower attachment mechanism of the carrier frame engages the counterpart projections on the axle, the carrier frame and the axle form a closed structure.

7. A cycle carrier structure as claimed in claim 1, in which the upper attachment mechanism is adapted for quick release attachment to a seat post of the cycle frame.

8. A cycle carrier structure as claimed in claim 7, in which the upper attachment mechanism comprises a hand-tightened screw mechanism.

9. A cycle carrier structure as claimed in claim 8, in which the upper attachment mechanism is connected to an interconnecting region of the bifurcated structure at which the limbs are interconnected to each other.

10. A cycle carrier structure as claimed in claim 9, in which the upper attachment mechanism is connected to the interconnecting region by a strut having an adjustable length.

11. A cycle carrier structure as claimed in claim 10, in which the strut is pivotably connected to the bifurcated structure.

12. A cycle carrier structure as claimed in claim 10, in which locking means is provided for locking the strut in an adjusted position.

13. A cycle carrier structure as claimed in claim 1, in which the cycle carrier frame and the axle form a closed structure.

14. A cycle carrier structure as claimed in claim 1, further comprising a projecting element which projects from the cycle carrier frame for securing the load carrier.

15. A cycle carrier structure as claimed in claim 14, in which the projecting element extends substantially parallel to the normal direction of travel of the cycle.

16. A cycle carrier structure as claimed in claim 15, in which the carrier frame comprises a bifurcated structure having a pair of limbs with free ends, the projecting element being provided on one of the limbs of the bifurcated structure.

17. A cycle carrier structure as claimed in claim 16, in which the projecting element is one of a pair of aligned projecting elements projecting to opposite sides of the respective limb.

18. A cycle carrier structure as claimed in claim 17, in which the load carrier comprises a latching mechanism having a pair of latches for respectively engaging the aligned projecting elements, the latching mechanism having a common manual actuator for actuating both of the latches.

19. A cycle carrier structure as claimed in claim 16, in which the respective limbs of the bifurcated structure are each provided with a said projecting element or a said pair of projecting elements.

20. A cycle carrier structure as claimed in claim 14, in which the or each projecting element comprises a pin which is received in a respective aperture extending through the cycle carrier frame.

21. A cycle carrier structure as claimed in claim 20, in which the pin is provided with locking means for securing the pin within the aperture.

22. A cycle carrier structure as claimed in claim 14, in which the load carrier is provided with a stabilising element which engages the cycle carrier frame for restraining the load carrier against rotation about the projecting element.

23. A cycle carrier structure as claimed in claim 22, in which the stabilising element comprises a hook.

24. A cycle carrier structure as claimed in claim 22, in which the stabilising element engages one of the limbs of the bifurcated structure.

25. A cycle provided with a cycle carrier structure as claimed in claim 1.

26. A cycle as claimed in claim 25, in which the axle supports the rear wheel of the cycle.

27. A cycle carrier structure as claimed in claim 1, in which the pannier comprises a bag.

28. A cycle carrier structure as claimed in claim 1, in which the pannier is mounted to the carrier structure in a manner to be positioned aside of a wheel of the cycle.

29. A cycle carrier structure for receiving a load carrier to be secured to the carrier structure, the carrier structure having a lower attachment mechanism for attachment to a lower region of a cycle frame and an upper attachment mechanism for attachment to an upper region of the cycle frame, the upper and lower attachment mechanisms comprising quick release mechanisms, the carrier structure comprising a bifurcated structure having a pair of limbs with free ends, the lower attachment mechanism being one of a pair of lower attachment mechanisms provided respectively at the free ends of the limbs, the bifurcated structure being an unitary structure of which the two limbs are constructed as a single component.

* * * * *